US011812391B2

(12) United States Patent
Dayal et al.

(10) Patent No.: US 11,812,391 B2
(45) Date of Patent: *Nov. 7, 2023

(54) SYSTEMS, METHODS, AND APPARATUS FOR COMBINED POWER CONTROL OF MULTIPLE TRANSMIT PATHS

(71) Applicant: Samsung Electronics Co., Ltd., Suwon-si (KR)

(72) Inventors: Pranav Dayal, San Diego, CA (US); Kee-Bong Song, San Diego, CA (US); Hou-Shin Chen, San Diego, CA (US); Sung-En Chiu, San Diego, CA (US); Karthik Nagarajan, San Diego, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/982,504

(22) Filed: Nov. 7, 2022

(65) Prior Publication Data

US 2023/0082170 A1 Mar. 16, 2023

Related U.S. Application Data

(63) Continuation of application No. 17/222,979, filed on Apr. 5, 2021, now Pat. No. 11,496,969.
(Continued)

(51) Int. Cl.
*H04W 52/08* (2009.01)
*H04W 52/24* (2009.01)

(52) U.S. Cl.
CPC ............ *H04W 52/24* (2013.01); *H04W 52/08* (2013.01)

(58) Field of Classification Search
CPC .............................. H04W 52/24; H04W 52/08
See application file for complete search history.

(56) References Cited

U.S. PATENT DOCUMENTS 7,620,130 B2    11/2009   Iwasaki et al.
9,048,913 B2*    6/2015   Kludt .................. H04B 7/0693
(Continued)

FOREIGN PATENT DOCUMENTS

JP        2012222379 A     11/2012
WO    WO-2020263475 A1 *   12/2020          H04B 7/0617
WO    WO-2020263507 A1 *   12/2020          H04W 16/28

OTHER PUBLICATIONS

Notice of Allowance for U.S. Appl. No. 17/222,979, dated Jun. 29, 2022.
(Continued)

*Primary Examiner* — Hai V Nguyen
(74) *Attorney, Agent, or Firm* — Renaissance IP Law Group LLP

(57) ABSTRACT

A method of controlling power in a transmission system may include determining a first transmit power of a first transmit path, determining a second transmit power of a second transmit path, and controlling the first transmit path and the second transmit path based on a combination of the first transmit power and the second transmit power. The combination of the first transmit power and the second transmit power may include a sum of the first transmit power and the second transmit power. Controlling the first transmit path and the second transmit path may include determining a first effective power target for the first transmit path based on the first transmit power and the second transmit power, and determining a second effective power target for the second transmit path based on the first transmit power and the second transmit power.

18 Claims, 11 Drawing Sheets

Related U.S. Application Data

(60) Provisional application No. 63/148,127, filed on Feb. 10, 2021, provisional application No. 63/091,287, filed on Oct. 13, 2020.

(56) References Cited

U.S. PATENT DOCUMENTS

| | | | | |
|---|---|---|---|---|
| 9,137,822 | B2* | 9/2015 | Sutivong | H04L 1/1692 |
| 9,253,727 | B1* | 2/2016 | Luna, Jr. | H04W 52/265 |
| 9,316,714 | B2* | 4/2016 | Rada | H04B 17/11 |
| 9,326,258 | B2 | 4/2016 | Takaoka et al. | |
| 9,713,019 | B2* | 7/2017 | Negus | H04B 7/0408 |
| 9,775,157 | B2* | 9/2017 | Luna, Jr. | H04W 52/146 |
| 10,021,656 | B2* | 7/2018 | Patel | H04L 5/0048 |
| 10,237,760 | B2* | 3/2019 | Negus | H04W 72/541 |
| 10,735,979 | B2* | 8/2020 | Negus | H04W 72/20 |
| 10,749,582 | B2 | 8/2020 | Forenza et al. | |
| 10,924,164 | B2* | 2/2021 | Brunel | H04B 17/13 |
| 10,972,191 | B2* | 4/2021 | Tong | H04B 7/2041 |
| 10,986,467 | B1* | 4/2021 | Bloechl | H04W 4/029 |
| 11,051,252 | B2* | 6/2021 | Mofidi | H04W 52/48 |
| 11,496,969 | B2* | 11/2022 | Dayal | H04W 52/346 |
| 2003/0161638 | A1* | 8/2003 | Fujiwara | H04B 10/532 |
| | | | | 398/186 |
| 2012/0008510 | A1 | 1/2012 | Cai et al. | |
| 2012/0009968 | A1* | 1/2012 | Kludt | H04B 7/0693 |
| | | | | 455/522 |
| 2012/0039284 | A1* | 2/2012 | Barbieri | H04W 48/10 |
| | | | | 370/329 |
| 2014/0140433 | A1 | 5/2014 | Cai et al. | |
| 2015/0230105 | A1* | 8/2015 | Negus | H04W 72/20 |
| | | | | 370/329 |
| 2016/0238409 | A1* | 8/2016 | Tiainen | H02K 11/225 |
| 2016/0323886 | A1* | 11/2016 | Luna, Jr. | H04W 52/0261 |
| 2017/0318482 | A1* | 11/2017 | Negus | H04W 24/02 |
| 2018/0035392 | A1* | 2/2018 | Patel | H04W 52/367 |
| 2018/0152235 | A1* | 5/2018 | Smoot | H04W 56/002 |
| 2018/0206141 | A1* | 7/2018 | Lupper | H04W 24/10 |
| 2019/0159045 | A1* | 5/2019 | Negus | H04W 48/16 |
| 2019/0363803 | A1* | 11/2019 | Tong | H04B 7/1851 |
| 2019/0372630 | A1* | 12/2019 | Brunel | H04W 52/42 |
| 2020/0059867 | A1* | 2/2020 | Haghighat | H04W 52/367 |
| 2020/0153410 | A1* | 5/2020 | Nielsen | H03H 9/542 |
| 2020/0187127 | A1* | 6/2020 | Mofidi | H04W 52/20 |
| 2020/0252115 | A1* | 8/2020 | Paramesh | H04B 1/18 |
| 2020/0252881 | A1* | 8/2020 | Noel | H04B 7/18517 |
| 2020/0280127 | A1* | 9/2020 | Hormis | H04B 7/155 |
| 2020/0351798 | A1* | 11/2020 | Ji | H04W 52/10 |
| 2020/0396622 | A1* | 12/2020 | Negus | H04W 24/02 |
| 2020/0413268 | A1* | 12/2020 | Yerramalli | H04W 72/046 |
| 2020/0413449 | A1* | 12/2020 | Yerramalli | H04B 7/0617 |
| 2021/0159949 | A1* | 5/2021 | Brunel | H04B 7/0426 |
| 2021/0345254 | A1* | 11/2021 | Zhou | H04W 52/367 |
| 2021/0360534 | A1* | 11/2021 | Wei | H04W 52/242 |
| 2022/0007200 | A1* | 1/2022 | Sevindik | H04L 27/2691 |

OTHER PUBLICATIONS

Office Action for U.S. Appl. No. 17/222,979, dated Jan. 21, 2022.

* cited by examiner

SYSTEMS, METHODS, AND APPARATUS FOR COMBINED POWER CONTROL OF MULTIPLE TRANSMIT PATHS

CROSS-REFERENCE TO RELATED APPLICATIONS

This application is a continuation of U.S. patent application Ser. No. 17/222,979, filed Apr. 5, 2021, which claims priority to, and the benefit of, U.S. Provisional Patent Application Ser. No. 63/091,287, filed Oct. 13, 2020, and U.S. Provisional Patent Application Ser. No. 63/148,127 filed Feb. 10, 2021, which are incorporated by reference in their entirety.

TECHNICAL FIELD

This disclosure relates generally to transmit power control, and more specifically to systems, methods, and apparatus for combined power control for multiple transmit paths.

BACKGROUND

Radio frequency (RF) transmission systems may have multiple transmit paths. In some embodiments, the sum of the output powers of each path may be controlled or limited to a specified value.

The above information disclosed in this Background section is only for enhancement of understanding of the background of the invention and therefore it may contain information that does not constitute prior art.

SUMMARY

A method of controlling power in a transmission system may include determining a first transmit power of a first transmit path, determining a second transmit power of a second transmit path, and controlling the first transmit path and the second transmit path based on a combination of the first transmit power and the second transmit power. The combination of the first transmit power and the second transmit power may include a sum of the first transmit power and the second transmit power. Controlling the first transmit path and the second transmit path may include determining a first effective power target for the first transmit path based on the first transmit power and the second transmit power, and determining a second effective power target for the second transmit path based on the first transmit power and the second transmit power. Controlling the first transmit path and the second transmit path may include determining a first error based on the first transmit power of the first transmit path, controlling the first transmit path based on the first error, determining a second error based on the second transmit power of the second transmit path, and controlling the second transmit path based on the second error. Controlling the first transmit path and the second transmit path may further include adjusting the first error based on a first parameter. Controlling the first transmit path and the second transmit path further may include determining a second parameter based on the first parameter, and adjusting the second error based on the second parameter. Adjusting the first error may include adjusting the first error statically, and adjusting the second error may include adjusting the second error statically. Adjusting the first error may include adjusting the first error dynamically, and adjusting the second error may include adjusting the second error dynamically. Adjusting the first error dynamically may include adjusting the first error based on an imbalance between the first transmit path and the second transmit path. Adjusting the first error dynamically may include adjusting the first error based on an error accumulation variable for the first transmit path and an error accumulation variable for the second transmit path. Controlling the first transmit path and the second transmit path further may include adjusting the first error dynamically based on a third parameter, determining a fourth parameter based on the third parameter, and adjusting the second error dynamically based on the fourth parameter. Controlling the first transmit path may further include controlling the first transmit path based on one or more additional criteria. The one or more additional criteria may include one or more of an efficiency and/or an error vector magnitude of the first transmit path. Controlling the first transmit path may further include limiting adjusting the first error based on the one or more additional criteria. The method may further include determining a third transmit power of a third transmit path, and controlling the first transmit path, the second transmit path, and the third transmit path based on a combination of the first transmit power, the second transmit power, and the third transmit power.

A system may include a first transmit path, a second transmit path, and a controller coupled to the first transmit path and the second transmit path and configured to determine a first transmit power of the first transmit path, determine a second transmit power of the second transmit path, and control the first transmit path and the second transmit path based on a combination of the first transmit power and the second transmit power. The first transmit path may be configured to provide the first transmit power to a first antenna element having a first polarization, and the second transmit path may be configured to provide the second transmit power to a second antenna element having a second polarization. The first transmit path may be coupled to a first phased array element having a first phase shift, and the second transmit path may be coupled to a second phased array element having a second phase shift.

A method of controlling power in a transmission system may include operating a first transmit path at a first transmit power, operating a second transmit path at a second transmit power, and jointly adjusting the first transmit power and the second transmit power to maintain a target level for a combination of the first transmit power and the second transmit power. Jointly adjusting the first transmit power and the second transmit power may include applying a bias to a measured power error of at least one of the first transmit path and the second transmit path.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Overview

RF transmission systems and methods in accordance with example embodiments of the disclosure may jointly adjust two or more transmit paths such that each path may contribute a different amount of output power while maintaining a target level for the total combined output power of the transmit paths. For example, in a system having two transmit paths corresponding to two different polarizations, the output power of each path may be adjusted to a different level while the sum of the output power of both paths may be maintained at a specified target level. As another example, in a phased array system having multiple transmit paths with a different phase shift per path, the paths may be jointly adjusted to maintain a target level for the combined output power using a different output power for an array element in each path.

The joint adjustment of two or more transmit paths may be implemented using a wide variety of techniques in accordance with example embodiments of the disclosure. For example, a different effective power target may be applied to each transmit path by applying a different bias to the measured error for each path in a closed loop power control (CLPC) scheme based on a target power per path. In some embodiments, the different biases may be applied statically, dynamically, or in a combination thereof. One or more biases may be determined, for example, based on characteristics of one or more transmit paths or components thereof, tuning processes, and/or the like. As another example, a different effective power target may be applied to each transmit path based on an imbalance between the paths. In some embodiments, the imbalance between the paths may be determined based on a difference between an error accumulation for each path.

In some embodiments, the power output of a transmit path may be adjusted, for example, based on changing one or more analog and/or digital gains, changing one or more bias and/or power supply voltages, and/or the like.

In some embodiments, one or more additional criteria may be used to adjust the power contribution of one or more transmit paths such as the efficiency of a path or one or more components thereof, an error vector magnitude (EVM) associated with a transmit path and/or the like.

In some embodiments, and depending on the implementation details, one or more of the techniques disclosed herein may improve the accuracy, stability, thermal management, reliability, and/or the like, of an RF transmission system, one or more transmit paths, and/or components thereof.

The principles disclosed herein have independent utility and may be embodied individually, and not every embodiment may utilize every principle. However, the principles may also be embodied in various combinations, some of which may amplify the benefits of the individual principles in a synergistic manner.

Total Output Power from Multiple Transmission Paths

Figure 1:
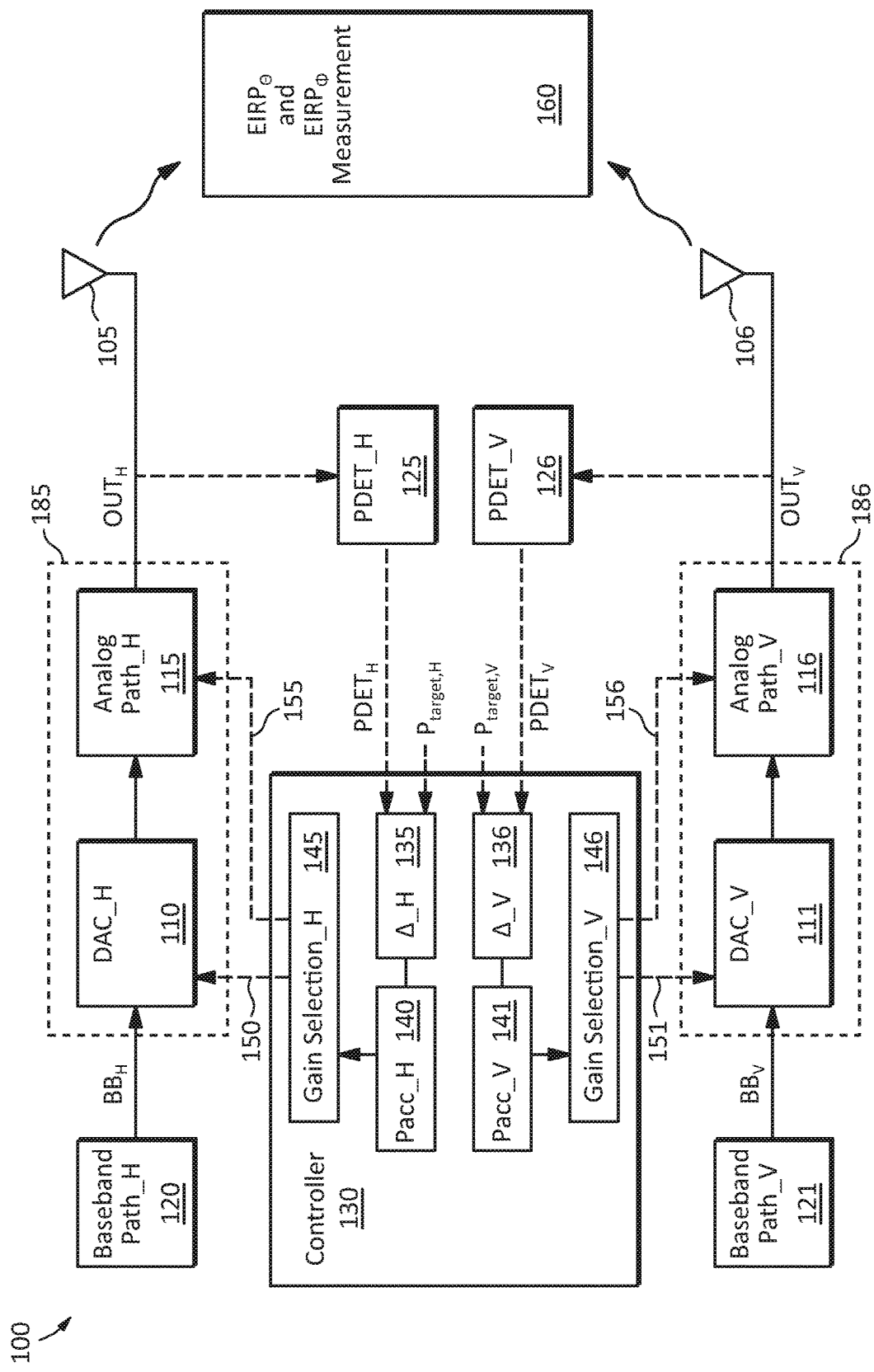
FIG. 1 illustrates a first embodiment of an RF transmission system having two transmit paths in accordance with example embodiments of the disclosure.

FIG. 1 illustrates a first embodiment of an RF transmission system having two transmit paths in accordance with example embodiments of the disclosure. The system 100 illustrated in FIG. 1 may generate two RF output signals $OUT_H$ and $OUT_V$ for horizontally and vertically polarized antenna elements, 105 and 106, respectively. The system 100 may include a horizontal transmit path 185 including a digital-to-analog converter (DAC) 110 and an analog path 115 which may generate the RF output signal $OUT_H$ in response to a horizontal baseband signal $BB_H$ from a baseband path 120. The system 100 may also include a vertical transmit path 186 including a DAC 111 and an analog path 116 which may generate the RF output signal $OUT_V$ in response to a vertical baseband signal $BB_V$ from a baseband path 121. The analog paths 115 and 116 may include one or more power processing components such as power amplifiers (PAs).

Power detectors 125 and 126 may generate feedback signals $PDET_H$ and $PDET_V$ that may provide an estimate of the actual output power from the horizontal and vertical transmit paths 185 and 186, respectively. The feedback signals $PDET_H$ and $PDET_V$ may be applied to a controller 130 that may implement a closed loop power control (CLPC) algorithm independently for each of the horizontal and vertical transmit paths 185 and 186. In some embodiments, the controller 130 may be implemented, for example, as part of a baseband processor.

For the horizontal path, the controller 130 may implement a differencing function 135 that may calculate an error signal $\Delta H$ by taking the difference of the feedback signal $PDET_H$ and a target power $P_{target,H}$. An error accumulation function $P_{acc,H}$ 140 may accumulate the error signal $\Delta_H$ to generate an accumulated error value $P_{acc,H}$. The accumulated error value $P_{acc,H}$ may then be used by a gain selection function 145 to select a digital gain 150 and/or an analog gain 155 for the DAC 110 and/or analog path 115, respectively. The use of a CLPC algorithm may enable controller 130 to dynamically adjust the digital gain 150 and/or analog gain 155 to maintain the output signal OUT$_H$ at a power level determined by the target power $P_{target,H}$ despite variations in the horizontal transmit path 185 due to factors such as component temperature changes and/or the like, or due to a change in the target power.

For the vertical path, the controller 130 may implement a similar CLPC algorithm using a target power $P_{target,V}$, a differencing function 136, an error signal $\Delta_V$, an error accumulation function 141, an accumulated error value $P_{acc,V}$, a gain selection function 146, a digital gain 151, and an analog gain 156.

The system 100 illustrated in FIG. 1 may be used, for example, in millimeter wave (mmWave) applications such as 3rd Generation Partnership Project (3GPP) new radio (NR) systems in which the total output power requirement of the system may be specified as the sum of the measured output power of the horizontal path and the measured output power of the vertical path. In some embodiments, output power may be specified as effective isotropically radiated power (EIRP) which may be expressed, for example, in decibels relative to one milliwatt (dBm).

The output powers EIRP$_\phi$ and EIRP$_\Theta$ may be measured, for example, using a measurement system 160 having a dual-polarization test receiver antenna which may measure the power contributions at its horizontal receive path 185 (EIRP$_\phi$) and its vertical receive path 186 (EIRP$_\Theta$).

The total effective isotropically radiated power (EIRP$_t$) may be computed as the sum of the measured EIRP$_\phi$ (dBm) and EIRP$_\Theta$ (dBm) Thus, total EIRP$_t$ may be expressed as follows:

$$EIRP_t(dBm) = 10 * \log_{10}\left(10^{\frac{EIRP_\Theta}{10}} + 10^{\frac{EIRP_\phi}{10}}\right). \qquad (Eq. 1)$$

In some embodiments, the system 100 may be implemented as part of a dual-polarity user equipment (UE) transmitter which may establish a target output power $P_{target,H}$(dBm) for the horizontal transmit path 185 and a target output power $P_{target,V}$(dBm) for the vertical transmit path 186. To comply with the total power requirement, $P_{target,H}$(dBm) and $P_{target,V}$(dBm) may be established such that their sum may provide the required EIRP$_t$ as follows:

$$EIRP_t(dBm) = 10 * \log_{10}\left(10^{\frac{P_{target,H}}{10}} + 10^{\frac{P_{target,V}}{10}}\right). \qquad (Eq. 2)$$

In some embodiments, to achieve the required total output power EIRP$_t$, the target powers $P_{target,H}$ and $P_{target,V}$ may be set to equal values so that each transmit path may contribute an equal amount to the total output power as follows:

$$P_{target,H} = P_{target,V} = EIRP_t(dBm) - 3 \text{ dB}. \qquad (Eq. 3)$$

Because 3 dB may be approximately equivalent to 0.5 in the linear domain, Eq. 3 may essentially establish values for $P_{target,H}$ and $P_{target,V}$ such that each of the transmit paths contributes one-half of the total output power.

Referring to FIG. 1, the controller 130 may use the feedback signals PDET$_H$ and PDET$_V$ to calculate the error signals $\Delta_H$ and $\Delta_V$ as follows:

$$\Delta_H = P_{target,H} - PDET_H \qquad (Eq. 4)$$

$$\Delta_V = P_{target,V} - PDET_V. \qquad (Eq. 5)$$

The error signals may then be tracked and accumulated separately per transmit path as follows:

$$P_{acc,H}[n] = P_{acc,H}[n-1] + \Delta_H \qquad (Eq. 6)$$

$$P_{acc,V}[n] = P_{acc,V}[n-1] + \Delta_V \qquad (Eq. 7)$$

where n may indicate a clock or other cycle of the controller 130.

The accumulated error variables $P_{acc,H}$ and $P_{acc,V}$ may then be used to select the digital and/or analog gains for the horizontal and vertical transmit paths 185 and 186, respectively, to maintain the output power at the level determined by the corresponding target power $P_{target,H}$ and $P_{target,V}$, respectively. In some embodiments, the digital and/or analog gains may be adjusted by comparing the accumulated error variables $P_{acc,H}$ and $P_{acc,V}$ to values in a lookup table as shown in Table 1 where the Index may correspond to a value of the accumulated error, the Power P_1, P_2, . . . , may represent an overall output power for the system, the analog gain G_0, G_1, . . . , may represent a gain for one of the analog paths 115 and 116, the digital gain DH_0, DH_1, . . . , may represent a gain for the DAC 110 in the horizontal path 185, and the digital gain DV_0, DV_1, . . . , may represent a gain for the DAC 111 in the vertical path 186.

TABLE 1

| Index | Power | Analog gain for H-path | Digital gain for H-path | Analog gain for V-path | Digital gain for V-path |
|---|---|---|---|---|---|
| 1 | P_1 | G_0 | DH_0 | G_0 | DV_0 |
| 2 | P_2 | G_0 | DH_1 | G_0 | DV_1 |
| 3 | P_3 | G_1 | DH_0 | G_0 | DV_0 |
| . . . | P_{N − 1} | G_10 | DH_1 | G_9 | DV_1 |
| N | P_N | G_10 | DH_2 | G_10 | DV_2 |

The values in Table 1 may be determined, for example, using an open-loop version of the system 100 such that the index corresponding to a required target power may be found to select the needed analog and/or digital gains per path. To implement CLPC, the index lookup may be adjusted by the value of $P_{acc}$ to account for deviation of actual gain from the value in the table. In some embodiments, the index lookup may be adjusted by $\alpha * P_{acc}$ where $\alpha$ may represent a loop gain parameter based on the gain of the specific transmit path.

In some embodiments, and depending on the implementation details, the closed-loop control scheme described above may drive the power errors $\Delta_H$ and $\Delta_V$ to around zero, resulting in the values of PDET$_H$ and PDET$_V$ converging to the values of the target powers $P_{target,H}$ and $P_{target,V}$, respectively, as provided by Equations 4 and 5. This may compensate for a certain amount of gain loss in one or more components of the horizontal and/or vertical transmit paths 185 and 186, for example, due to temperature changes.

However, the gain characteristics of the horizontal and vertical transmit paths 185 and 186 may vary differently with respect to temperature, and this may lead to unequal output powers from the two paths. Moreover, one of the paths may be weaker in the sense of not having enough gain (e.g., due to transmit path characteristics) to provide the target output power determined by $P_{target,H}$ or $P_{target,V}$ at a given temperature. Therefore, it may not be able to provide the target output power even at the highest digital and/or analog gain settings. In this type of situation, the accumulated errors for the weaker path may increase at a faster rate than the other path which may cause saturation of the corresponding digital and/or analog gains and/or accompanying thermal instability (e.g., increasing temperature). This may cause the output power of the weaker path to fall further as the temperature increases, thereby reducing the total output power from the specified $EIRP_t$ level. Thus, in some embodiments, and depending on the implementation details, a transmission system in which multiple transmit paths are configured to contribute equal power to a total target output power may not provide adequate performance.

Spatial Water Filling

Figure 2:
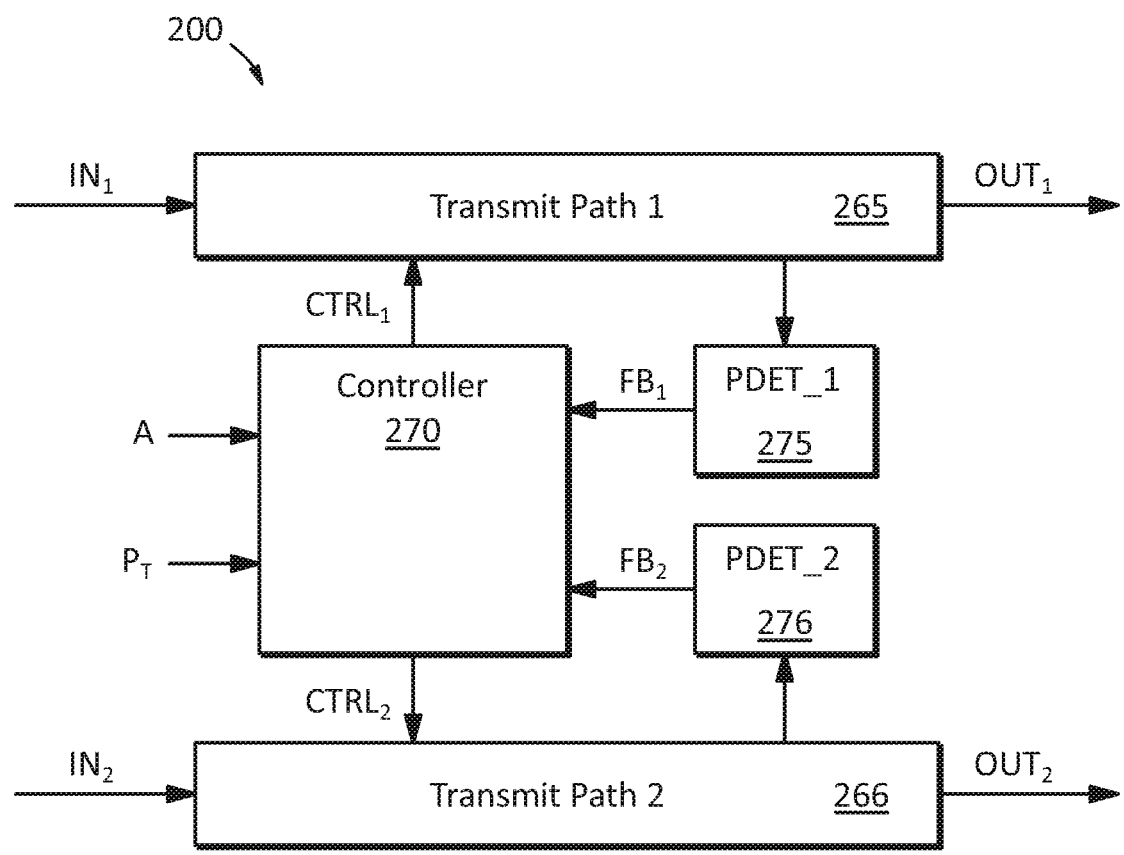
FIG. 2 illustrates a second embodiment of an RF transmission system having two transmit paths in accordance with example embodiments of the disclosure.

FIG. 2 illustrates a second embodiment of an RF transmission system having two transmit paths in accordance with example embodiments of the disclosure. The system 200 illustrated in FIG. 2 may include a first transmit path 265 that may generate a first RF output signal $OUT_1$ in response to a first input signal $IN_1$, and a second transmit path 266 that may generate a second RF output signal $OUT_2$ in response to a second input signal $IN_2$.

In some embodiments, a controller 270 may implement one or more control techniques that may enable the two transmit paths to contribute different amounts of output power while maintaining the combined output power from the two paths at a specified target level. In some embodiments, this may be characterized as a spatial water filling technique as described below.

The combined output power from the two transmit paths 265 and 266 may be evaluated using a variety of different techniques in accordance with example embodiments of the disclosure. For example, in some embodiments, the combined output power may be determined as a scalar sum of the output powers of the two transmit paths. In other embodiments, the combined output power may be determined as a vector sum, a sum of squares, cubes, etc., of the output powers, and/or the like. Moreover, the measurements may be based on any measurement technique including any time scale, for example, instantaneous, peak, average, root-mean-square (RMS), and/or the like.

The controller 270 may receive first and second feedback signals $FB_1$ and $FB_2$ from first and second power detectors 275 and 276 which may provide a measure or estimate of the output power of the first and second transmit paths 265 and 266, respectively.

The controller 270 may further receive one or more target inputs PT that may specify, for example, one or more target power levels such as a total target output power for the combined outputs of the first and second transmit paths 265 and 266, one or more individual target power levels for one or more of the first and second transmit paths 265 and 266, and/or the like.

The controller 270 may further receive one or more adjustment inputs A that may provide, for example, one or more parameters that may be used to jointly adjust the relative amount of power provided by each of the transmit paths 265 and 266. The adjustments to the relative amounts of power may be made statically, dynamically, or a combination thereof. For example, in a static adjustment technique, a fixed bias may be applied to an initial value of a gain adjustment variable for each transmit path (e.g., based on systematic path gain difference between the two transmit paths). As another example, in a dynamic adjustment technique, an adjustment may be based on a function of the accumulated errors for both transmit paths to enable the paths to settle on unequal target powers. In some embodiments, even if the transmit paths start with equal power targets, the controller may monitor the accumulated error for each path and effectively redistribute the target powers to settle on unequal targets.

In some embodiments, one or more additional criteria may be used to adjust the relative power contribution of one or more transmit paths such as the efficiency of a path or one or more components thereof, an EVM associated with a transmit path and/or the like. For example, in some embodiments that may implement quadrature phase-shift keying (QPSK) in a 3GPP NR system, the relative power contributions of the different transmit paths may be controlled to provide an EVM value of about 10-15 percent for one or more of the paths. In some embodiments, an EVM control scheme may be implemented with a lookup table or other data structure may be used to indicate that a certain EVM may be expected at a specified operating point based, for example, on a pre-characterized value. In some embodiments, the values of one or more adjustment parameters may be limited so as to maintain the EVM value for one or more transmit paths.

As another example, the relative power contributions of the two paths may be adjusted to prevent the power differential from becoming so great that the performance of one path becomes unacceptably low.

In some embodiments, the transmit paths may be jointly adjusted by leaving one transmit path at a specified target power level and varying the target power level of the other transmit path to maintain a constant or other specified combined power level from both transmit paths.

The controller 270 may generate a control signal $CTRL_1$ that may control the output power of the first transmit path 265. The controller 270 may also generate a control signal $CTRL_2$ that may control the output power of the second transmit path 266. In some embodiments, the power output of a transmit path may be adjusted, for example, based on changing one or more analog and/or digital gains, changing one or more bias and/or power supply voltages, and/or the like.

In some embodiments, the controller 270 may jointly process detector-based errors in closed loop control for two or more paths. The controller 270 may allow lower steady state power for a path that may exhibit more gain drop over time, while boosting the power for a stronger path so that the combined power is controlled to the target level. Some embodiments may provide an explicit method for redistributing power, for example, by introducing an initial bias parameters and a scaling factor that may multiply a dynamic difference of error accumulation on the paths. Some embodiments may dynamically adjust the target power per path, for example, to account for process and/or temperature variation of components.

The transmit paths 265 and 266 may be implemented with any number and/or types of transmission components including digital and/or analog amplifiers, filters, DACs, mixers, up-converters, down-converters, couplers, signal splitters, phase shifters, and/or the like.

The power detectors 275 and 276 may be implemented with hardware, software, or any combination thereof. For example, a full or partial hardware implementation may include any number and/or types of power detection components including diode detectors, square-law detectors, RMS detectors, logarithmic amplifiers, and/or the like. As another example, a full or partial software implementation may receive samples of the output signal from an analogto-digital converter (ADC) and process the samples using any suitable algorithm to provide a measure of the output power of one of the transmit paths 265 and 266. In some embodiments, one or more of the power detectors may be implemented as part of the controller 270, part of one of the transmit paths 265 and 266, or distributed there between. The power detectors 275 and 276 may be coupled to the transmit paths 265 and 266, respectively, through any number and/or type of coupling apparatus including a directional coupler, a directional bridge, an airline coupler, and/or the like.

The controller 270 may be implemented with hardware, software, or any combination thereof. For example, a full or partial hardware implementation may include any number and/or type of analog components including amplifiers, adders, multipliers, dividers, filters, and/or the like, and any number and/or type of digital components including combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), state machines, data converters such as ADCs, DACs and/or the like. Full or partial software implementations may include one or more processor cores, memories, program and/or data storage, and/or the like, which may be located locally and/or remotely, and which may be programmed to execute instructions to perform one or more functions of the components of the controller 270.

The system 200 illustrated in FIG. 2 is not limited to any particular application. For example, in some embodiments, the system 200 illustrated in FIG. 2 may implement a multi-polarization system in which the first output signal $OUT_1$ from the first path may be used to drive a first antenna or antenna element with a first polarization, and the second output signal $OUT_2$ from the second path may be used to drive a second antenna or antenna element with a second polarization. As another example, in some embodiments, the system 200 illustrated in FIG. 2 may implement a phased array system in which the two transmit paths may receive a common input signal from an RF power source, and the two outputs $OUT_1$ and $OUT_2$ may drive separate phased array elements though one or more phase shifters.

Figure 3:
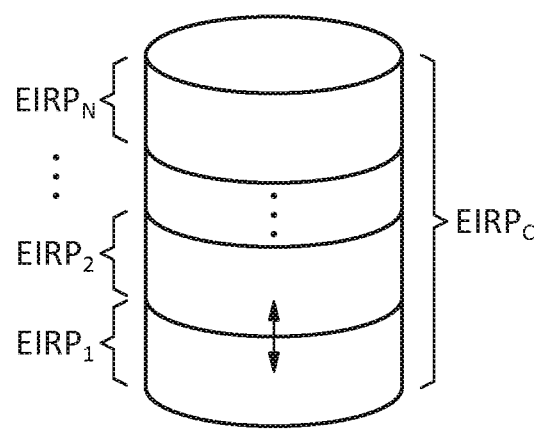
FIG. 3 illustrates a conceptualization of an embodiment of a spatial water filling technique in accordance with example embodiments of the disclosure.

FIG. 3 illustrates a conceptualization of an embodiment of a spatial water filling technique in accordance with example embodiments of the disclosure. The combined output power of multiple transmit paths may be characterized as a power space having a combined power $EIRP_C$ that may be filled with individual power contributions $EIRP_1$, $EIRP_2$, . . . $EIRP_N$ from N transmit paths. In an example operation, if the power contribution from any one of the transmit paths decreases for any reason (e.g., a component temperature change), the power space occupied by that path may decrease. The power contribution from a different transmit path may therefore be increased to keep the combined power space $EIRP_C$ full as shown by the arrow.

Static Adjustment Techniques

Figure 4:
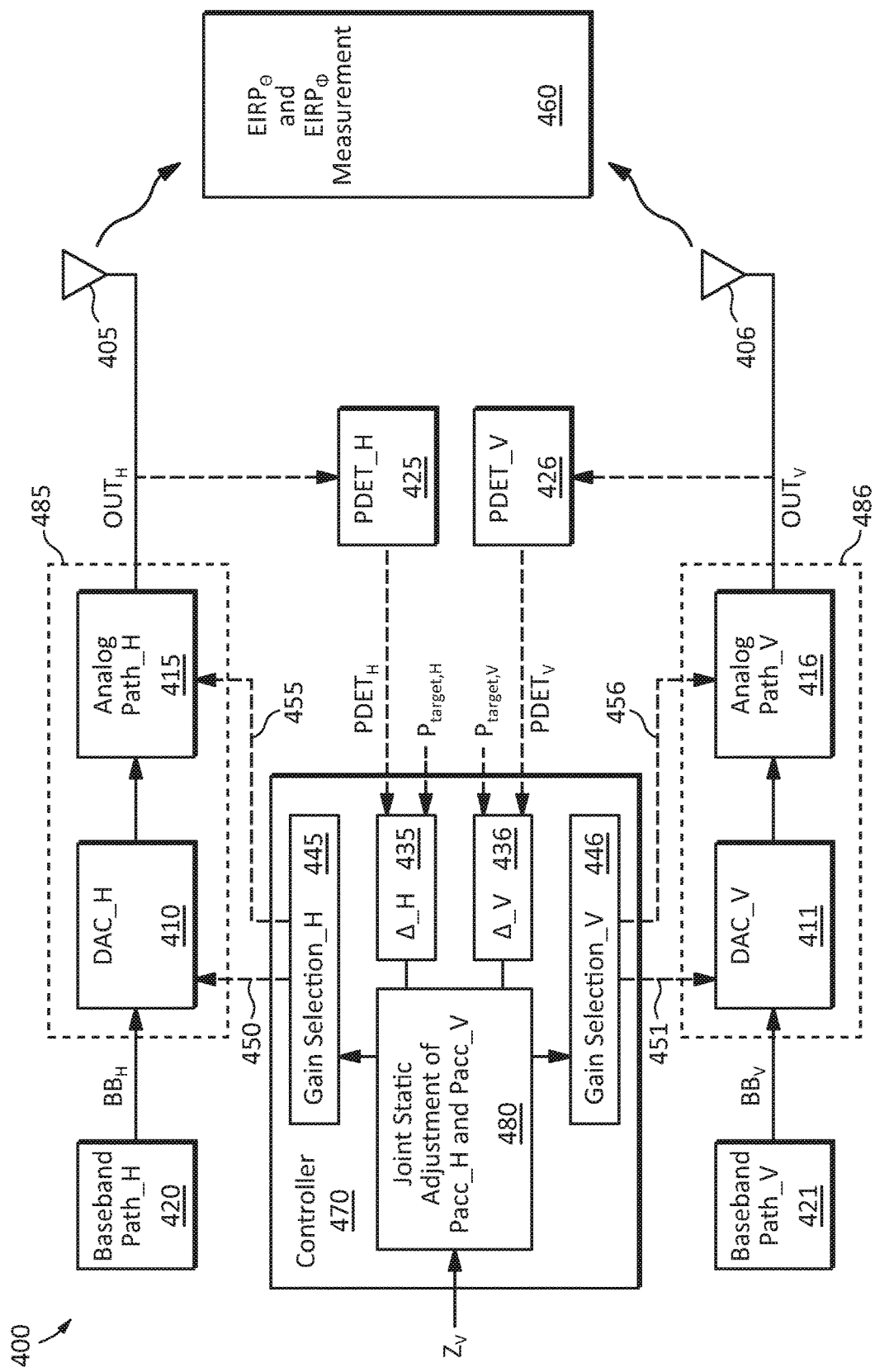
FIG. 4 illustrates an example embodiment of an RF transmission system that may implement a static adjustment technique in accordance with example embodiments of the disclosure.

FIG. 4 illustrates an example embodiment of an RF transmission system that may implement a static adjustment technique in accordance with example embodiments of the disclosure. The system 400 illustrated in FIG. 4 may be used, for example, to implement the system 200 illustrated in FIG. 2. For purposes of illustrating the inventive principles, the system 400 may be described in the context of a system in which the transmit paths 485 and 486 may generate signals for horizontal and vertical antenna polarizations, respectively, and the combined output power of the two paths may be determined as the sum of the powers of each path. However, the principles are not limited to these example implementation details, and the system 400 may be used for any other application.

The system 400 may include some components similar to those illustrated in the embodiment illustrated in FIG. 2 and which may be indicated by reference numbers ending in the same digits. However, the controller 470 in the system 400 illustrated in FIG. 4 may be configured to implement one or more static control techniques that may jointly adjust the first and second transmit paths 485 and 486 to enable the two transmit paths to contribute different amounts of output power while maintaining the combined output power from the two paths at a specified target level.

In the system 400 illustrated in FIG. 4, the controller 470 may include logic 480 that may receive an adjustment parameter $Z_V$ which may be used to adjust the relative contributions of the two transmit paths 485 and 486. For example, a value of $Z_V$ (which may also be referred to as a bias) may be selected in the decibel domain such that $Z_V$ is less than 3 dB (corresponding to 2 in the linear domain). The value of a second adjustment parameter $Z_H$ may then be determined as follows:

$$Z_H = 10 * \log_{10}\left(2 - 10^{\frac{Z_V}{10}}\right) \quad \text{(Eq. 8)}$$

which, in the linear domain, may correspond to the linear sum of $Z_H$ and $Z_V$ being equal to two as follows:

$$10^{\frac{Z_H}{10}} + 10^{\frac{Z_V}{10}} = 2. \quad \text{(Eq. 9)}$$

After calculating $Z_H$ based on $Z_V$, the power errors $\Delta_H$ and $\Delta_V$ may then be adjusted as follows:

$$\Delta_H = \Delta_H + Z_H \quad \text{(Eq. 10)}$$

$$\Delta_V = \Delta_V + Z_V. \quad \text{(Eq. 11)}$$

The adjusted values of $\Delta_H$ and $\Delta_V$ may then be applied to the system using Equations 6 and 7 (which, for convenience, are reproduced here as Equations 12 and 13) as follows:

$$P_{acc,H}[n] = P_{acc,H}[n-1] + \Delta_H \quad \text{(Eq. 12)}$$

$$P_{acc,V}[n] = P_{acc,V}[n-1] + \Delta_V. \quad \text{(Eq. 13)}$$

In some embodiments, if the same target power is applied for each transmit path (e.g., $P_{target,H} = P_{target,V}$), when the adjusted values of $\Delta_H$ and $\Delta_V$ are applied to the system, it may have the effect of applying a different effective target power to each transmit path. Thus, the power of the horizontal transmit path 185 (which may be expressed as $EIRP_H$) may converge to $EIRP_t - 3 + Z_H$, and the power of the vertical transmit path 186 (which may be expressed as $EIRP_V$) may converge to $EIRP_t - 3 + Z_V$, which may therefore preserve the target value of the combined output power $EIRP_t$.

In some embodiments, a value of the adjustment parameter $Z_V$ may be determined, for example, based on prior knowledge of, or estimate of, a systematic path gain difference between the transmit paths 485 and 486 or one or more components thereof. A value of the adjustment parameter $Z_V$ may also be determined based on various tuning processes. For example, one or more real or simulated transmit paths may be constructed and measured empirically to determine one or more values for $Z_V$. As another example, a statistical sample of physical devices including the transmit paths 485 and 486 may be tested and tuned empirically to determine one or more values for $Z_V$. Alternatively, a value for $Z_H$ may be determined, and the value of $Z_V$ may be determined by a complementary expression of Equation 8.

Dynamic Adjustment Techniques

Figure 5:
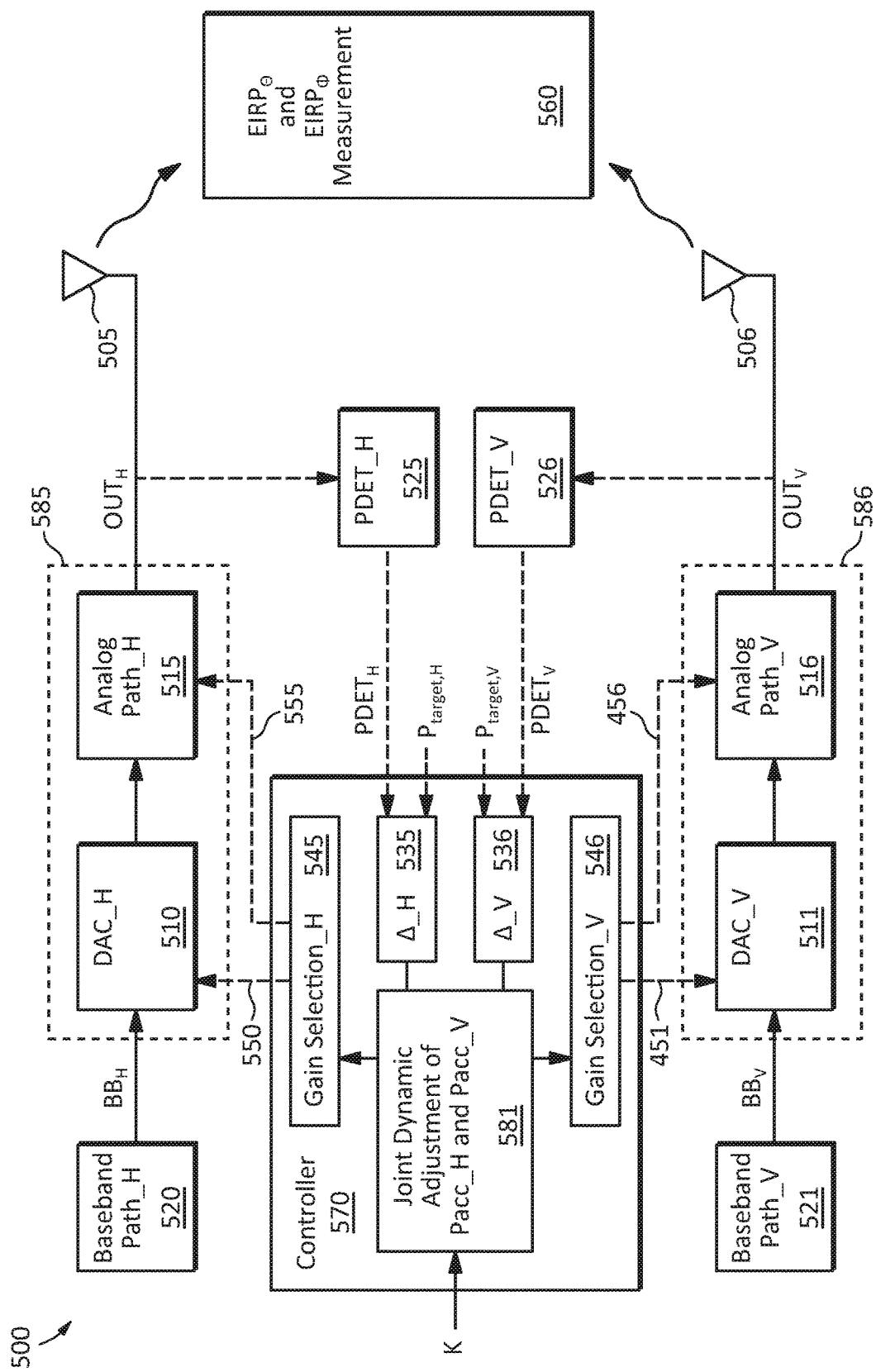
FIG. 5 illustrates an example embodiment of an RF transmission system that may implement a dynamic adjustment technique in accordance with example embodiments of the disclosure.

FIG. 5 illustrates an example embodiment of an RF transmission system that may implement a dynamic adjustment technique in accordance with example embodiments of the disclosure. The system 500 illustrated in FIG. 5 may be used, for example, to implement the system 200 illustrated in FIG. 2. For purposes of illustrating the inventive principles, the system 500 may be described in the context of a system in which the transmit paths 585 and 586 may generate signals for horizontal and vertical antenna polarizations, respectively, and the combined output power of the two paths may be determined as the sum of the powers of each path. However, the principles are not limited to these example implementation details, and the system 500 may be used for any other application.

The system 500 may include some components similar to those illustrated in the embodiment illustrated in FIG. 4 and which may be indicated by reference numbers ending in the same digits. However, the controller 570 in the system 500 illustrated in FIG. 5 may include logic 581 which may be configured to receive an adjustment parameter K and implement one or more dynamic adjustment schemes, for example, in which the values of $P_{acc,H}$ and $P_{acc,V}$ may be adjusted based on the difference between $P_{acc,H}$ and $P_{acc,V}$ and the adjustment parameter K.

In some embodiments, if the same target power is applied for each transmit path (e.g., $P_{target,H} = P_{target,V}$), the difference between $P_{acc,H}$ and $P_{acc,V}$ may represent the path imbalance between the transmit paths 585 and 586. In some embodiments, the logic 581 in controller 570 may use this difference to determine an error (e.g., an instantaneous error) for each transmit path. For example, after determining the value of the adjustment parameter K, values for two additional error adjustment parameters $Y_H$ and $Y_V$ may be determined as follows.

For $P_{acc,H} < P_{acc,V}$, $Y_V$ may be determined as the maximum of −10 and $(P_{acc,H} - P_{acc,V})*K$ as follows:

$$Y_V = \max(-10, (P_{acc,H} - P_{acc,V})*K). \quad \text{(Eq. 14)}$$

And then $Y_H$ may be determined as follows:

$$Y_H = 10 * \log_{10}\left(2 - 10^{\frac{Y_V}{10}}\right). \quad \text{(Eq. 15)}$$

Otherwise, $Y_H$ may be determined as the maximum of −10 and $(P_{acc,V} - P_{acc,H})*K$ as follows:

$$Y_H = \max(-10, (P_{acc,V} - P_{acc,H})*K). \quad \text{(Eq. 16)}$$

And then $Y_V$ may be determined as follows:

$$Y_V = 10 * \log_{10}\left(2 - 10^{\frac{Y_H}{10}}\right). \quad \text{(Eq. 17)}$$

After calculating $Y_H$ based on $Y_V$, the power errors $\Delta_H$ and $\Delta_V$ may then be adjusted as follows:

$$\Delta_H = \Delta_H + Y_H \quad \text{(Eq. 18)}$$

$$\Delta_V = \Delta_V + Y_V. \quad \text{(Eq. 19)}$$

The adjusted values of $\Delta_H$ and $\Delta_V$ may then be applied to the system using Equations 6 and 7 (which, for convenience, are reproduced here as Equations 20 and 21) as follows:

$$P_{acc,H}[n] = P_{acc,H}[n-1] + \Delta_H \quad \text{(Eq. 20)}$$

$$P_{acc,V}[n] = P_{acc,V}[n-1] + \Delta_V. \quad \text{(Eq. 21)}$$

As with the adjustment parameters $Z_V$ and $Z_H$, the adjustment parameter K may be determined in various manners including, for example, various tuning processes, statistical sampling, and/or the like.

Combined Adjustment Techniques

Figure 6:
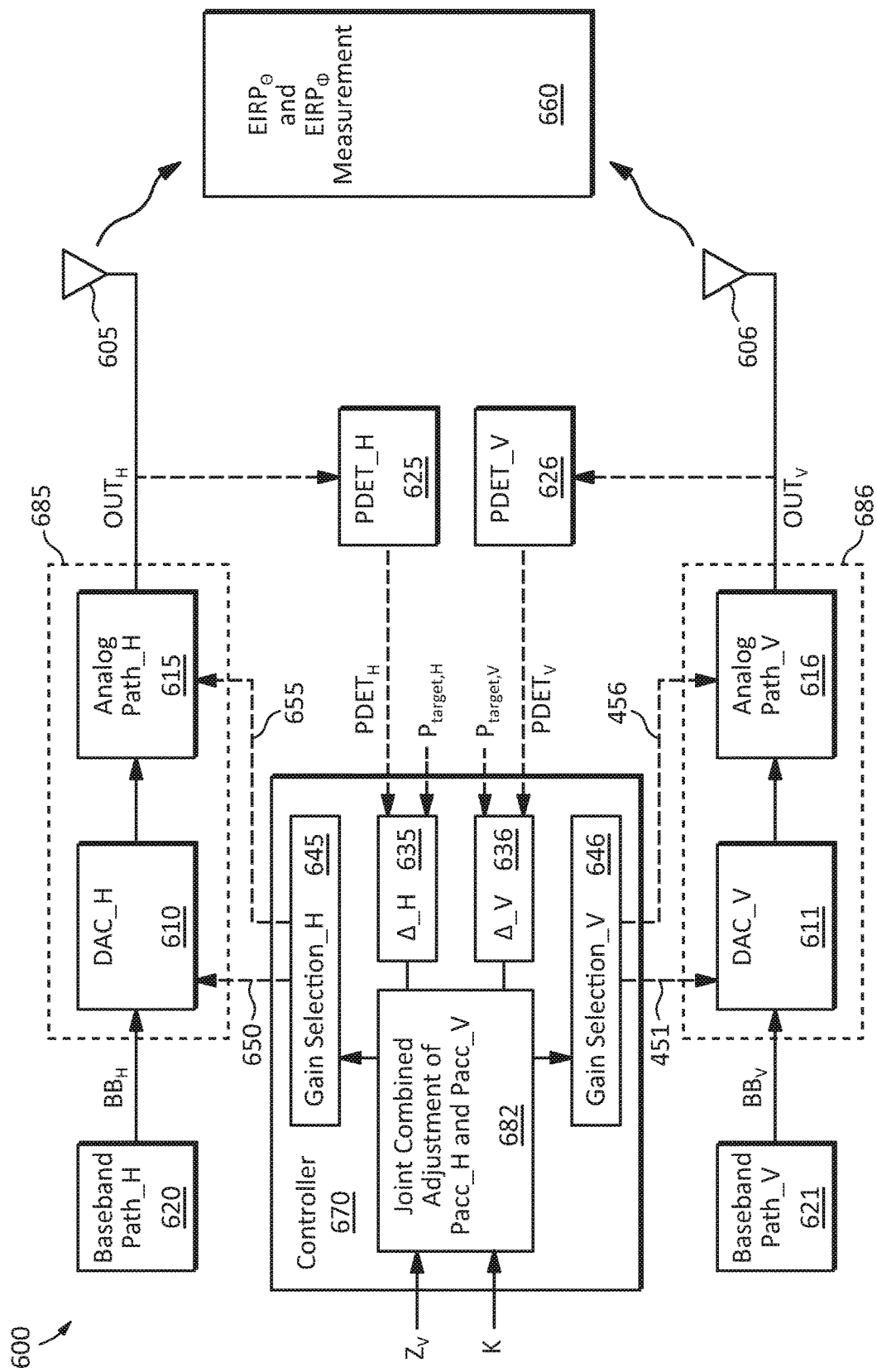
FIG. 6 illustrates an example embodiment of an RF transmission system that may implement a combined adjustment techniques in accordance with example embodiments of the disclosure.

FIG. 6 illustrates an example embodiment of an RF transmission system that may implement a combined adjustment technique in accordance with example embodiments of the disclosure. The system 600 illustrated in FIG. 6 may be used, for example, to implement the system 200 illustrated in FIG. 2. For purposes of illustrating the inventive principles, the system 600 may be described in the context of a system in which the transmit paths 685 and 686 may generate signals for horizontal and vertical antenna polarizations, respectively, and the combined output power of the two paths may be determined as the sum of the powers of each path. However, the principles are not limited to these example implementation details, and the system 600 may be used for any other application.

The system 600 may include some components similar to those illustrated in the embodiments illustrated in FIGS. 4 and 5 which may be indicated by reference numbers ending in the same digits. However, the controller 670 in the system 600 illustrated in FIG. 6 may include logic 682 which may be configured to implement one or more combined static and dynamic adjustment schemes based on the adjustment parameters $Z_V$ and K as illustrated in FIG. 6.

Figure 7:
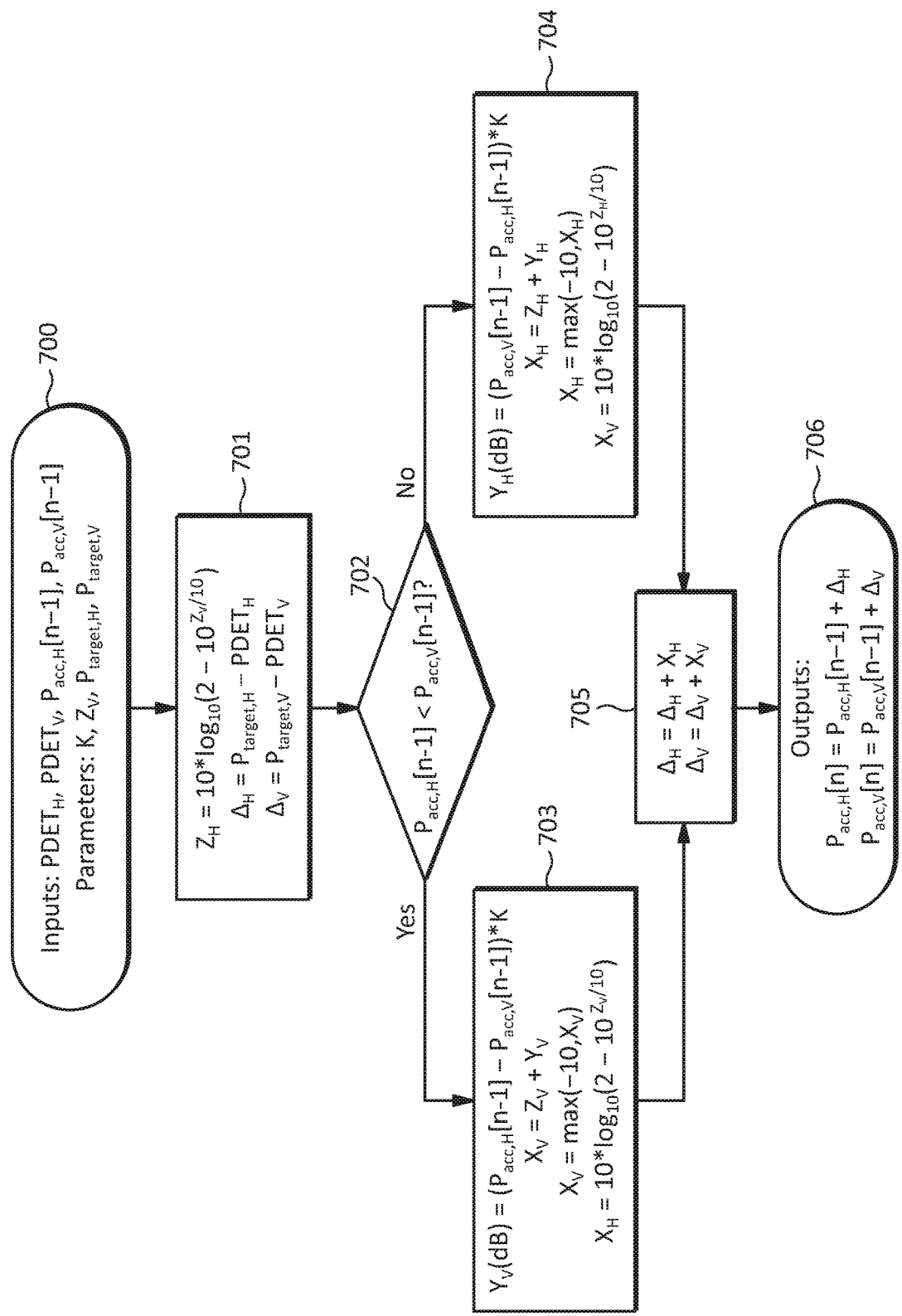
FIG. 7 illustrates an example embodiment of a method for implementing a combined adjustment techniques in accordance with example embodiments of the disclosure.

In some embodiments, to implement a combined static and dynamic adjustment scheme, the system 600 may implement two combined adjustment parameters $X_H$(dB) and $X_V$(dB) that may be determined from the parameters $Z_H$, $Z_V$, $Y_H$, and $Y_V$ (which may be implemented as described above with respect to FIG. 4 and FIG. 5) as described in FIG. 7.

FIG. 7 illustrates an example embodiment of a method for implementing a combined adjustment technique in accordance with example embodiments of the disclosure. The method illustrated in FIG. 7 may begin at operation 700 where the method may receive one or more of the inputs $PDET_H$, $PDET_V$, $P_{acc,H}[n-1]$, and $P_{acc,V}[n-1]$, and one or more of the parameters K, $Z_V$, $P_{target,H}$, and $P_{target,V}$.

At operation 701, the method may determine $Z_H$ from $Z_V$ using Equation 8 (which, for convenience, is reproduced here as Equation 22) as follows:

$$Z_H = 10 * \log_{10}\left(2 - 10^{\frac{Z_V}{10}}\right). \quad \text{(Eq. 22)}$$

Also at operation 701, the method may determine the power error $\Delta_H$ and $\Delta_V$ using Equations 4 and 5 (which for convenience are reproduced here as Equations 23 and 24) as follows:

$$\Delta_H = P_{target,H} - PDET_H \quad \text{(Eq. 23)}$$

$$\Delta_V = P_{target,V} - PDET_V. \quad \text{(Eq. 24)}$$

At operation 702, if $P_{acc,H}[n-1] < P_{acc,V}[n-1]$, the method may branch to operation 703 where $Y_V$ may be determined as follows:

$$Y_V(dB) = (P_{acc,H}[n-1] - P_{acc,V}[n-1])*K. \quad \text{(Eq. 25)}$$

Then $X_V$ may be determined by $$X_V = Z_V + Y_V, \quad \text{(Eq. 26)}$$

$X_V$ may be limited to the maximum of −10 and $X_V$ as follows:

$$X_V = \max(-10, X_V), \quad \text{(Eq. 27)}$$

and $X_H$ may be determined from $X_V$ as follows:

$$X_H = 10 * \log_{10}\left(2 - 10^{\frac{X_V}{10}}\right). \quad \text{(Eq. 28)}$$

If, however, at operation 702, $P_{acc,H}[n-1] \geq P_{acc,V}[n-1]$, the method may branch to operation 704 where $Y_H$ may be determined as follows:

$$Y_H(\text{dB}) = (P_{acc,V}[n-1] - P_{acc,H}[n-1]) * K. \quad \text{(Eq. 29)}$$

Then $X_H$ may be determined by $$X_H = Z_H + Y_H, \quad \text{(Eq. 30)}$$

$X_H$ may be limited to the maximum of −10 and $X_H$ as follows:

$$X_H = \max(-10, X_H), \quad \text{(Eq. 31)}$$

and $X_V$ may be determined from $X_H$ as follows:

$$X_V = 10 * \log_{10}\left(2 - 10^{\frac{X_H}{10}}\right). \quad \text{(Eq. 32)}$$

Having determined the values of $X_H$ and $X_V$ at operation 703 or 704, the method may then proceed to operation 705 where the power errors $\Delta_H$ and $\Delta_V$ may be adjusted as follows:

$$\Delta_H = \Delta_H + X_H \quad \text{(Eq. 33)}$$

$$\Delta_V = \Delta_V + X_V. \quad \text{(Eq. 34)}$$

At operation 706, the adjusted errors $\Delta_H$ and $\Delta_V$ may then be accumulated using Equations 6 and 7 (which for convenience are reproduced here as Equations 35 and 36) as follows:

$$P_{acc,H}[n] = P_{acc,H}[n-1] + \Delta_H \quad \text{(Eq. 35)}$$

$$P_{acc,V}[n] = P_{acc,V}[n-1] + \Delta_V \quad \text{(Eq. 36)}$$

to determine new values of the accumulation variables $P_{acc,H}$, and $P_{acc,V}$ which may be used to adjust the gain of the transmit paths 685 and 686, respectively. Thus, the errors $\Delta_H$ and $\Delta_V$ for the H transmit path and the V transmit path may be adjusted based on $X_H$(dB) and $X_V$(dB), respectively.

Some embodiments may ensure that the linear sum of $X_H$ and $X_V$ is two and the linear sum of $Z_H$ and $Z_V$ is two. This may ensure, for example, that the combined output of the two transmit paths is maintained at the target value.

Although the principles of the adjustment parameters disclosed herein are not limited to any specific values, in some implementations, the value of $Z_V$ may be limited to a range between −6 dB and 2.8 dB to ensure that $Z_H$ is always between −10 dB and 2.4 dB. In a software based implementation, this may help restrict the input and/or output range of a look-up table that may be used for computation of the function $$g_u = 10 * \log_{10}\left(2 - 10^{\frac{u}{10}}\right) \quad \text{(Eq. 37)}$$

which may be applied instead of an explicit computation (e.g., for Equations 8, 15, 17, 22, 28, and 32).

In a first special case implementation of the system and/or method illustrated in FIGS. 6 and 7, the adjustment parameter K may be set to zero (K=0). In this case, the system and/or method may only implement static initial bias values based on $Z_H$ and/or $Z_V$ such that the effective target powers may $P_{target,H} + Z_H$ and $P_{target,V} + Z_V$. If $Z_H$ and $Z_V$ sum to two in the linear domain, there may effectively only be one free parameter (e.g., $Z_V$ in FIG. 7) as in the system illustrated in FIG. 4. For purposes of illustration, and without limitation, example implementation values may be $Z_H$=+1 dB and $Z_V$=−1.3 dB.

In a second special case implementation of the system and/or method illustrated in FIGS. 6 and 7, the adjustment parameters $Z_H$ and $Z_V$ may both be set to zero ($Z_H$=$Z_V$=0). In this case, the system and/or method may only implement a dynamic adjustment of the target powers $P_{target,H}$ and $P_{target,V}$ based on the adjustment parameter K as in the system illustrated in FIG. 5.

In a third special case implementation of the system and/or method illustrated in FIGS. 6 and 7, the adjustment parameters $Z_H$, $Z_V$, and K may all be set to zero, in which case, the closed loop power control of each transmit path 685 and 686 may be processed separately (e.g., with no spatial water filling).

Figure 8:
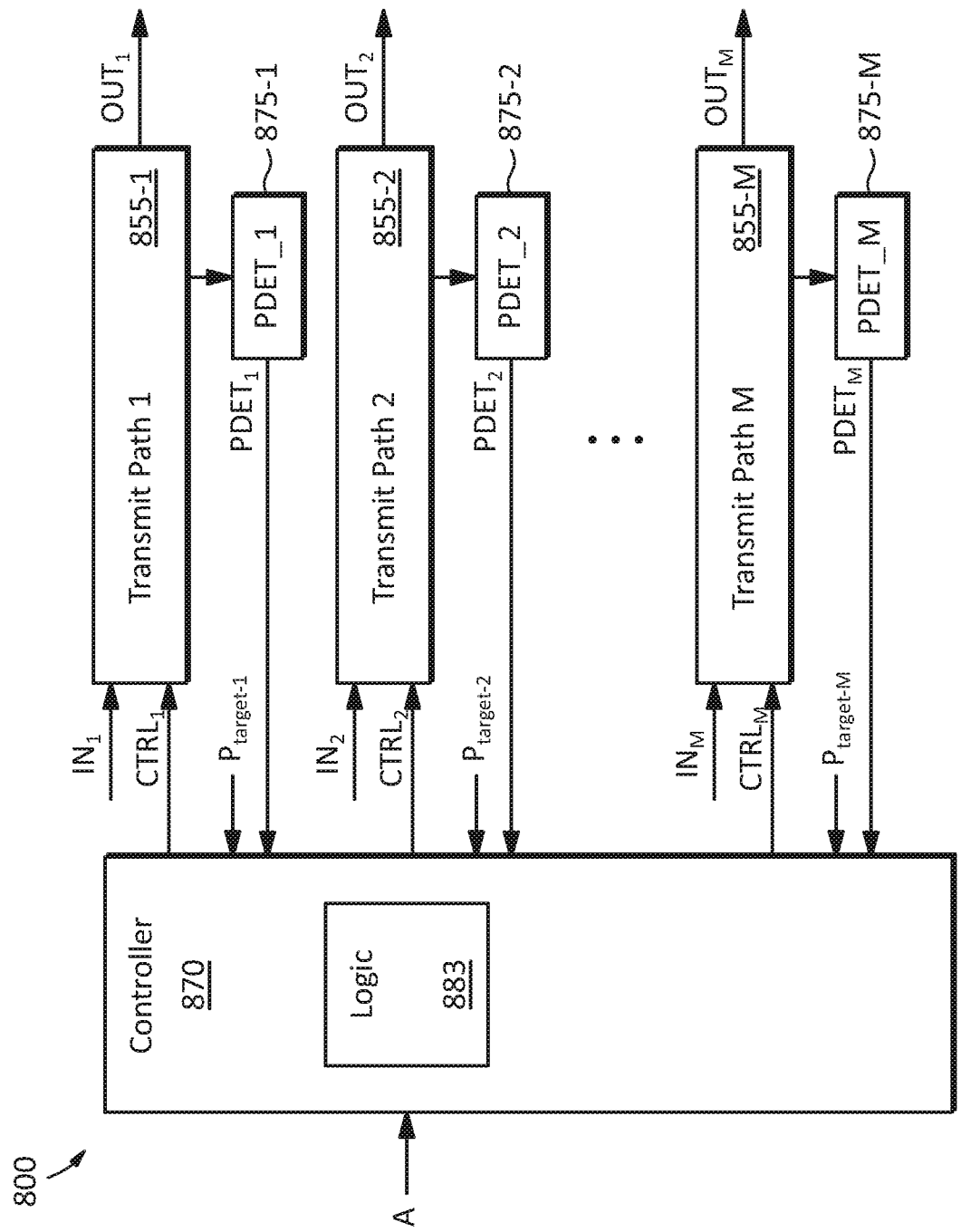
FIG. 8 illustrates an embodiment of an RF transmission system having more than two transmit paths in accordance with example embodiments of the disclosure.

FIG. 8 illustrates an embodiment of an RF transmission system having more than two transmit paths in accordance with example embodiments of the disclosure. The system 800 illustrated in FIG. 8 may be implemented with components and/or techniques that may be similar to those described above with respect to the embodiment illustrated in FIG. 2. However, the system 800 may include M transmit paths 855-1, 855-2, . . . , 855-M, which may generate RF output signals $OUT_1$, $OUT_2$, . . . , $OUT_M$ based on input signals $IN_1$, $IN_2$, . . . , $IN_M$. The system 800 may further include M power detectors 875-1, 875-2, . . . , 875-M which may generate feedback signals $PDET_1$, $PDET_2$, . . . , $PDET_M$ that may provide a measure or estimate of the output power of the corresponding transmit paths 855-1, 855-2, . . . , 855-M, respectively, to a controller 870.

The controller 870 may receive a corresponding target power $P_{target-1}$, $P_{target-2}$, . . . , $P_{target-M}$ corresponding to the transmit paths 855-1, 855-2, . . . , 855-M, respectively. The controller 870 may include differencing functions that may generate power error signals $\Delta_1$, $\Delta_2$, . . . , $\Delta_M$ based on the corresponding target power signals and detector feedback signals. The controller 870 may further include gain selection functions to generate control signals $CTRL_1$, $CTRL_2$ . . . , $CTRL_M$ to control the transmit paths 855-1, 855-2, . . . , 855-M, respectively.

The controller 870 may include logic 883 that may implement any of the static, dynamic and/or combined CLPC techniques and/or other spatial water filling techniques described above, for example, in response to one or more adjustment signals A, but extended to M>2 paths for which corresponding variables may be implemented as follows.

For each path i ∈ {1, M}:

$$P_{target,i} = EIRP_i(\text{dBm}) - 10 * \log_{10}(M), \quad \text{(Eq. 38)}$$

$$\Delta_i = P_{target,i} - PDET_i + a_i, \quad \text{(Eq. 39)}$$

and $$P_{acc,i}[n] = P_{acc,i}[n-1] + \Delta_i, \quad \text{(Eq. 40)}$$

where the following constraint may be maintained:

$$\sum_{i=1}^{M} 10^{a_i/10} = M \qquad \text{(Eq. 41)}$$

and, in general, each $a_i$ may be a function of individual $P_{acc}$ values as well as any other initial fixed bias.

Phased Array Implementation

Figure 9:
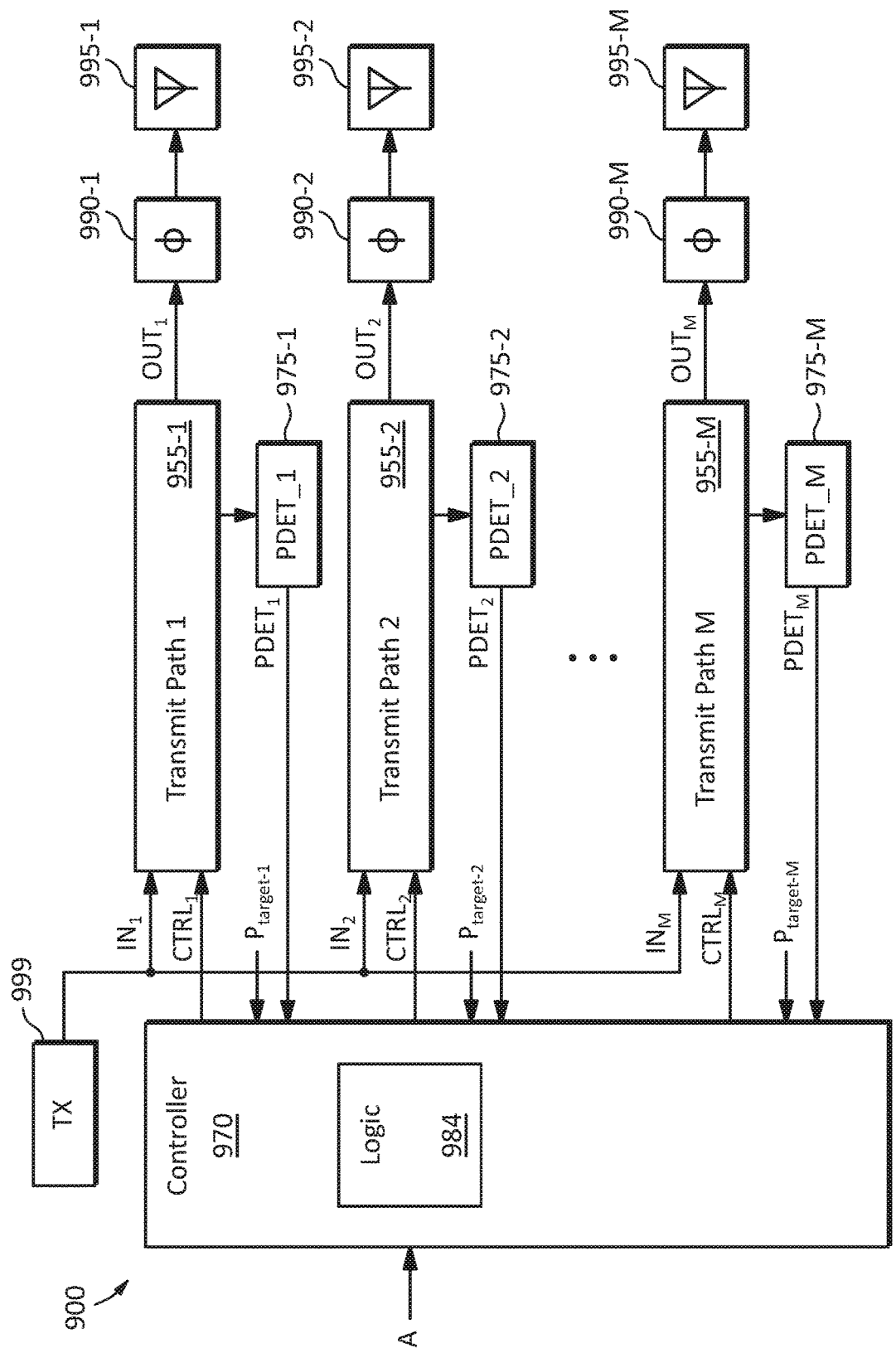
FIG. 9 illustrates an embodiment of an RF transmission system for a phased array application in accordance with example embodiments of the disclosure.

FIG. 9 illustrates an embodiment of an RF transmission system for a phased array application in accordance with example embodiments of the disclosure. The system 900 illustrated in FIG. 9 may be implemented with components and/or techniques that may be similar to those described above with respect to the embodiment illustrated in FIG. 8 in which similar components may be indicated by reference numbers ending in the same digits. However, in the system 900, the inputs of the M transmit paths 955-1, 955-2, ..., 955-M may be coupled to a common RF signal transmitter 999. The output signal from the transmitter 999 may be split as an analog signal by the M transmit paths 955-1, 955-2, ..., 955-M and coupled to corresponding phased array elements 995-1, 995-2, ..., 995-M through corresponding phase shifters 990-1, 990-2, ..., 990-M.

The controller 970 may include logic 984 that may implement any of the static, dynamic and/or combined CLPC techniques and/or other spatial water filling techniques described above. Thus, the power supplied by the transmit paths 955-1, 955-2, ..., 955-M to the individual phased array elements 995-1, 995-2, ..., 995-M may be jointly controlled so that different amounts of power may be provided to each of the array elements 995-1, 995-2, ..., 995-M while maintaining the combined power of the entire array at a specified target value.

The one or more control techniques implemented by the controller 970 may be similar to those described above with respect to the embodiments illustrated in FIGS. 1-8. However, because of the phase relationship between elements of the phased array, the addition of the error corrections may be implemented in the voltage domain instead of the power domain. Thus, functions of the form shown in Equation 37 may instead be implemented as $$g_u = 20 * \log_{10}\left(2 - 10^{\frac{u}{20}}\right) \qquad \text{(Eq. 42)}$$

because power may be determined based on the square of voltage domain signals.

Additional Embodiments

Figure 10:
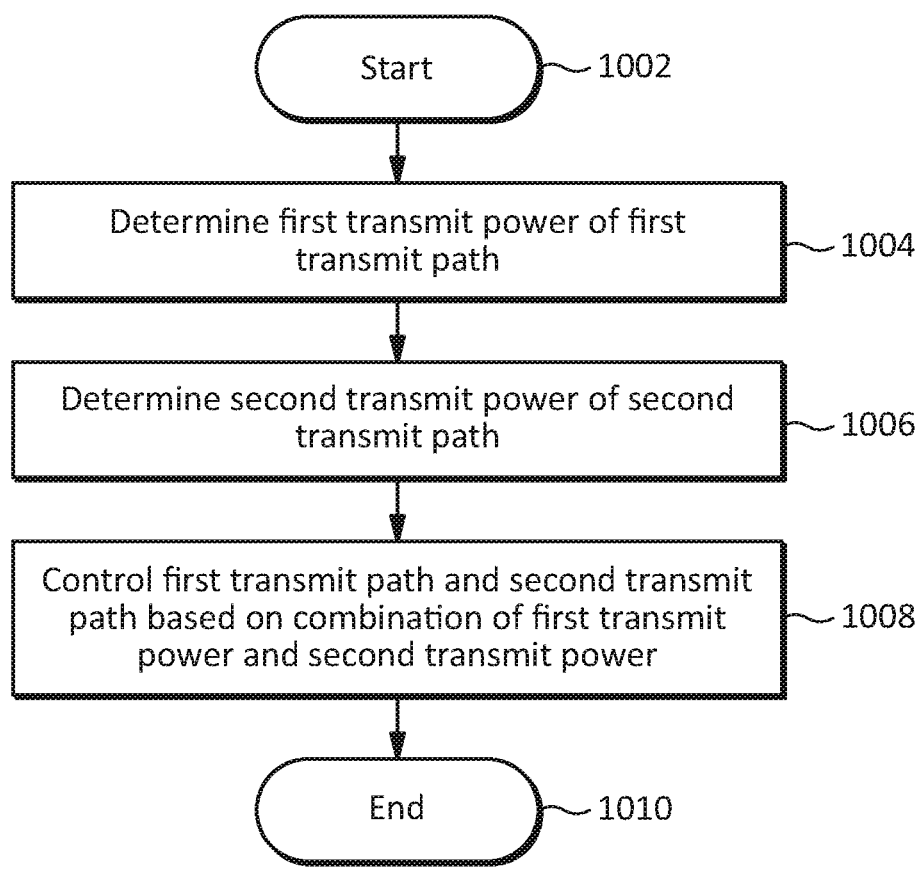
FIG. 10 illustrates a method of controlling power in a transmission system in accordance with example embodiments of the disclosure.

FIG. 10 illustrates a method of controlling power in a transmission system in accordance with example embodiments of the disclosure. The method may begin at operation 1002. At operation 1004, the method may determine a first transmit power of a first transmit path. At operation 1006, the method may determine a second transmit power of a second transmit path. At operation 1008, the method may control the first transmit path and the second transmit path based on a combination of the first transmit power and the second transmit power. The method may end at operation 1010.

Figure 11:
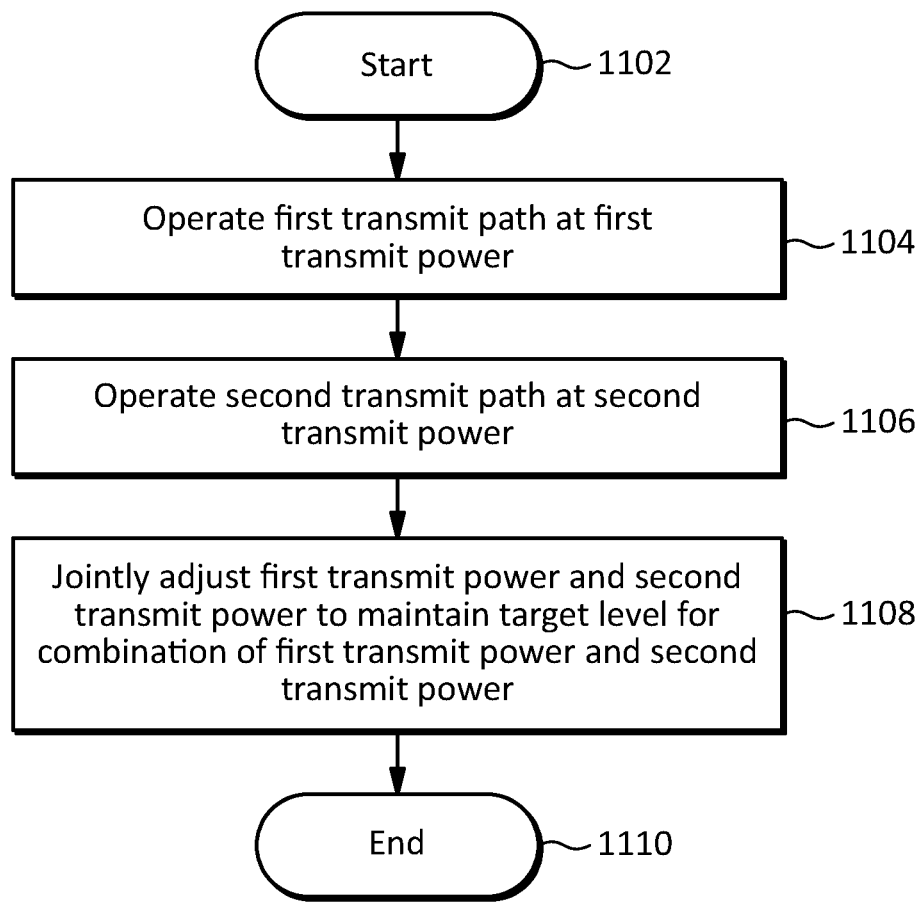
FIG. 11 illustrates another method of controlling power in a transmission system in accordance with example embodiments of the disclosure.

FIG. 11 illustrates another method of controlling power in a transmission system in accordance with example embodiments of the disclosure. The method may begin at operation 1102. At operation 1104, the method may operate a first transmit path at a first transmit power. At operation 1106, the method may operate a second transmit path at a second transmit power. At operation 1108, the method may jointly adjust the first transmit power and the second transmit power to maintain a target level for a combination of the first transmit power and the second transmit power. The method may end at operation 1110.

The embodiment illustrated in FIGS. 10 and 11, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Figure 12:
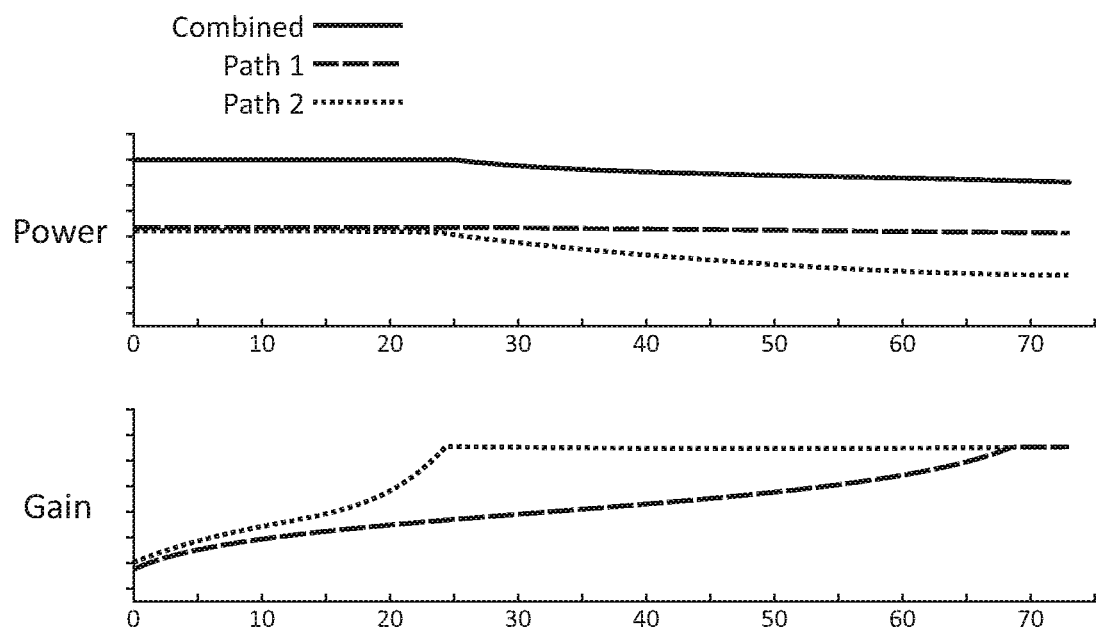
FIG. 12 illustrates example stress test performance curves for an embodiment of a transmit system without spatial water filling in accordance with example embodiments of the disclosure.
Figure 13:
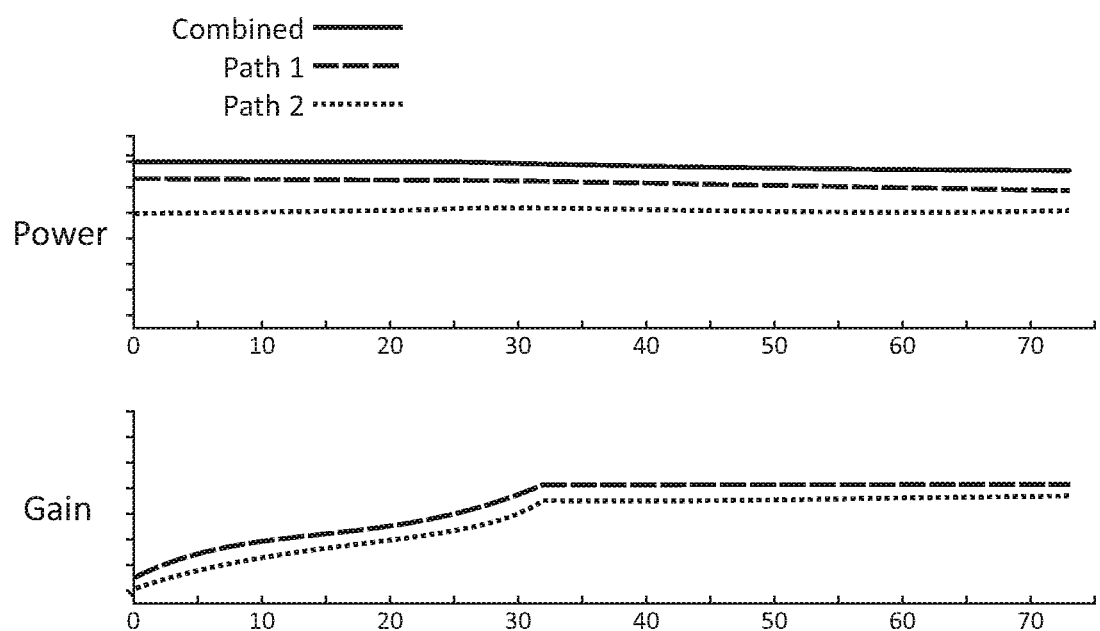
FIG. 13 illustrates example stress test performance curves for an embodiment of a transmit system with spatial water filling in accordance with example embodiments of the disclosure.

FIG. 12 illustrates example stress test performance curves for an embodiment of a transmit system without spatial water filling in accordance with example embodiments of the disclosure. FIG. 13 illustrates example stress test performance curves for an embodiment of a transmit system with spatial water filling in accordance with example embodiments of the disclosure. The curves shown in FIGS. 12 and 13 are for purposes of illustrating the principles of the disclosure and may not represent the performance results of any specific physical or simulated embodiments.

The curves illustrated in FIG. 12 may be generated, for example, by a system such as that illustrated in FIG. 2. The top graph may show the output power of Path 1, Path 2, and the combined output power on a time scale shown in seconds along the horizontal axis. The bottom graph may show the gain settings of Path 1 and Path 2 on the same time scale.

Referring to the top graph in FIG. 12, because the same target power is applied to both transmit paths, the CLPC applied to each path may attempt to maintain the same output power from each path. However, in this example, Path 2 may be a weaker path, and therefore, it may experience a greater gain loss as the temperature of the system increases. Thus, as shown in the bottom graph in FIG. 12, the gain setting of Path 2 may increase more rapidly than Path 1 to maintain the same output power.

At about 25 seconds, the gain of Path 2 may plateau at a maximum value, and thus, Path 2 may be unable to maintain its target output power. Thus, as shown in the top graph in FIG. 12, the output power of Path 2 may begin to decrease at about 25 seconds. Because the target power for Path 1 may not be adjusted, the combined output power may also begin to decrease at about 25 seconds.

The curves illustrated in FIG. 13 may be generated, for example, by a system such as the one illustrated in FIG. 4 which may implement a static adjustment technique in accordance with example embodiments of the disclosure. The top graph may show the output power of Path 1, Path 2, and the combined output power on a time scale shown in seconds along the horizontal axis. The bottom graph may show the gain settings of Path 1 and Path 2 on the same time scale.

Referring to the top graph in FIG. 13, because the system may implement a spatial water filling technique, different target powers may be applied to the different transmit paths. For example, a bias may be applied to the errors such that the weaker path may have a lower effective target power. As the system temperature increases, both paths may be able to maintain their target power outputs for a longer time until their gains plateau after about 30 seconds.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. A reference to a component or element may refer to only a portion of the component or element.

Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles may be modified in arrangement and detail without departing from the inventive concepts, such changes and modifications are considered to fall within the scope of the following claims.

The invention claimed is:

1. A method of controlling power in a transmission system, the method comprising:
   detecting a change in a first transmit power of a first transmit path; and
   controlling a second transmit path based on the detected change in the first transmit power;
   wherein the first transmit path comprises one or more first transmission components; and
   wherein the second transmit path comprises one or more second transmission components.

2. The method of claim 1, further comprising controlling the first transmit path based on the detected change in the first transmit power of the first transmit path.

3. The method of claim 2, wherein controlling the first transmit path and the second transmit path comprises:
   updating a first power target for the first transmit path; and
   updating a second power target for the second transmit path.

4. The method of claim 2, wherein controlling the first transmit path and the second transmit path is performed to maintain a total transmit power at a predetermined level, the total transmit power including the first transmit power of the first transmit path and a second transmit power of the second transmit path.

5. The method of claim 2, wherein controlling the first transmit path and the second transmit path comprises:
   determining a first error based on the first transmit power of the first transmit path and a first power target;
   controlling the first transmit path based on the first error;
   determining a second error based on the a second transmit power of the second transmit path and a second power target; and
   controlling the second transmit path based on the second error.

6. The method of claim 2, wherein controlling the first transmit path further comprises controlling the first transmit path based on one or more additional criteria.

7. The method of claim 6, wherein the one or more additional criteria comprises one or more of an efficiency and/or an error vector magnitude of the first transmit path.

8. The method of claim 6, further comprising determining a first error based on the first transmit power of the first transmit path and a first power target, wherein controlling the first transmit path further comprises limiting adjusting the first error based on the one or more additional criteria.

9. The method of claim 1, further comprising controlling a third transmit path based on the detected change in the first transmit power.

10. A system comprising:
    a first transmit path comprising one or more first transmission components;
    a second transmit path comprising one or more second transmission components; and
    a controller coupled to the first transmit path and the second transmit path and configured to:
       detect a change in a first transmit power of the first transmit path; and
       control the second transmit path based on the detected change in the first transmit power.

11. The system of claim 10, wherein the controller is further configured to control the first transmit path based on the detected change in the first transmit power of the first transmit path.

12. The system of claim 11, wherein the controller is further configured to control the first transmit path and the second transmit path by:
    updating a first power target for the first transmit path; and
    updating a second power target for the second transmit path.

13. The system of claim 11, wherein the controller is further configured to control the first transmit path and the second transmit to maintain a total transmit power at a predetermined level, the total transmit power including the first transmit power of the first transmit path and a second transmit power of the second transmit path.

14. The system of claim 11, wherein the controller is further configured to control the first transmit path and the second transmit path by:
    determining a first error based on the first transmit power of the first transmit path and a first power target;
    controlling the first transmit path based on the first error;
    determining a second error based on a second transmit power of the second transmit path and a second power target; and
    controlling the second transmit path based on the second error.

15. The system of claim 11, wherein the controller is further configured to control the first transmit path based on one or more additional criteria.

16. The system of claim 15, wherein the one or more additional criteria comprises one or more of an efficiency and/or an error vector magnitude of the first transmit path.

17. The system of claim 15, wherein the controller is further configured to:
    determine a first error based on the first transmit power of the first transmit path and a first power target; and
    control the first transmit path by limiting adjusting the first error based on the one or more additional criteria.

18. The system of claim 10, wherein the controller is further configured to control a third transmit path based on the detected change in the first transmit power.

* * * * *